United States Patent [19]

Stencel

[11] Patent Number: 5,178,500
[45] Date of Patent: Jan. 12, 1993

[54] FASTENER WITH LOCKING RETAINER RING

[75] Inventor: Edgar L. Stencel, Alta Loma, Calif.

[73] Assignee: Mag Aerospace Industries, Inc., Compton, Calif.

[21] Appl. No.: 690,864

[22] Filed: Apr. 24, 1991

[51] Int. Cl.⁵ ............ F16B 31/00; F16B 39/34
[52] U.S. Cl. ............ 411/2; 411/290; 411/303; 29/456
[58] Field of Search ............ 411/2, 3, 4, 301–303, 411/246, 247, 288, 290, 324, 366, 352, 353; 29/456, 525.1; 403/408.1

[56] References Cited

U.S. PATENT DOCUMENTS

| | | |
|---|---|---|
| 293,295 | 2/1884 | Agnew . |
| 295,960 | 4/1884 | Van Dusen . |
| 495,363 | 4/1893 | Obrist . |
| 1,049,765 | 1/1913 | Reed . |
| 1,237,400 | 8/1917 | Sosh ............ 411/324 |
| 1,578,889 | 3/1926 | Harris . |
| 1,795,570 | 3/1931 | Nilson . |
| 1,809,620 | 6/1931 | Cole . |
| 2,320,031 | 5/1943 | Danforth . |
| 2,450,694 | 10/1948 | Sauer . |
| 2,727,551 | 12/1955 | Rees . |
| 3,390,906 | 7/1965 | Wing . |
| 3,763,725 | 10/1973 | Reiland . |
| 4,068,555 | 1/1978 | Volkman ............ 411/2 |
| 4,260,005 | 4/1981 | Stencel . |
| 4,600,343 | 7/1986 | Frerejacques ............ 411/303 |
| 4,692,078 | 9/1987 | Dessouroux ............ 411/290 |

FOREIGN PATENT DOCUMENTS

| | | | |
|---|---|---|---|
| 2352400 | 6/1974 | Fed. Rep. of Germany ............ 411/2 |
| 720212 | 3/1980 | U.S.S.R. ............ 411/324 |

*Primary Examiner*—Neill R. Wilson
*Attorney, Agent, or Firm*—Pretty, Schroeder, Brueggemann & Clark

[57] ABSTRACT

A fastener and method for fastening panels is disclosed. The fastener comprises a bolt and a nut with a locking feature to prevent loosening of the fastener from vibration after it has been set. The locking feature comprises a frustoconical tip on the inserted end of the bolt that engages a retainer ring in the nut. When setting the fastener, the retainer ring deforms around the outer end of the tip and slides down the narrowing frustoconical surface of the tip until the fastener is fully set. Unthreading of the bolt from the nut is prevented since the retainer ring will resist deformation along the increasingly larger diameter portions of the frustoconical tip. In another aspect of the invention, the nut is provided with shear tabs which engage a wrenching tool. These tabs are designed to shear when the fastener is fully set to prevent further application of torque by the tool.

14 Claims, 2 Drawing Sheets

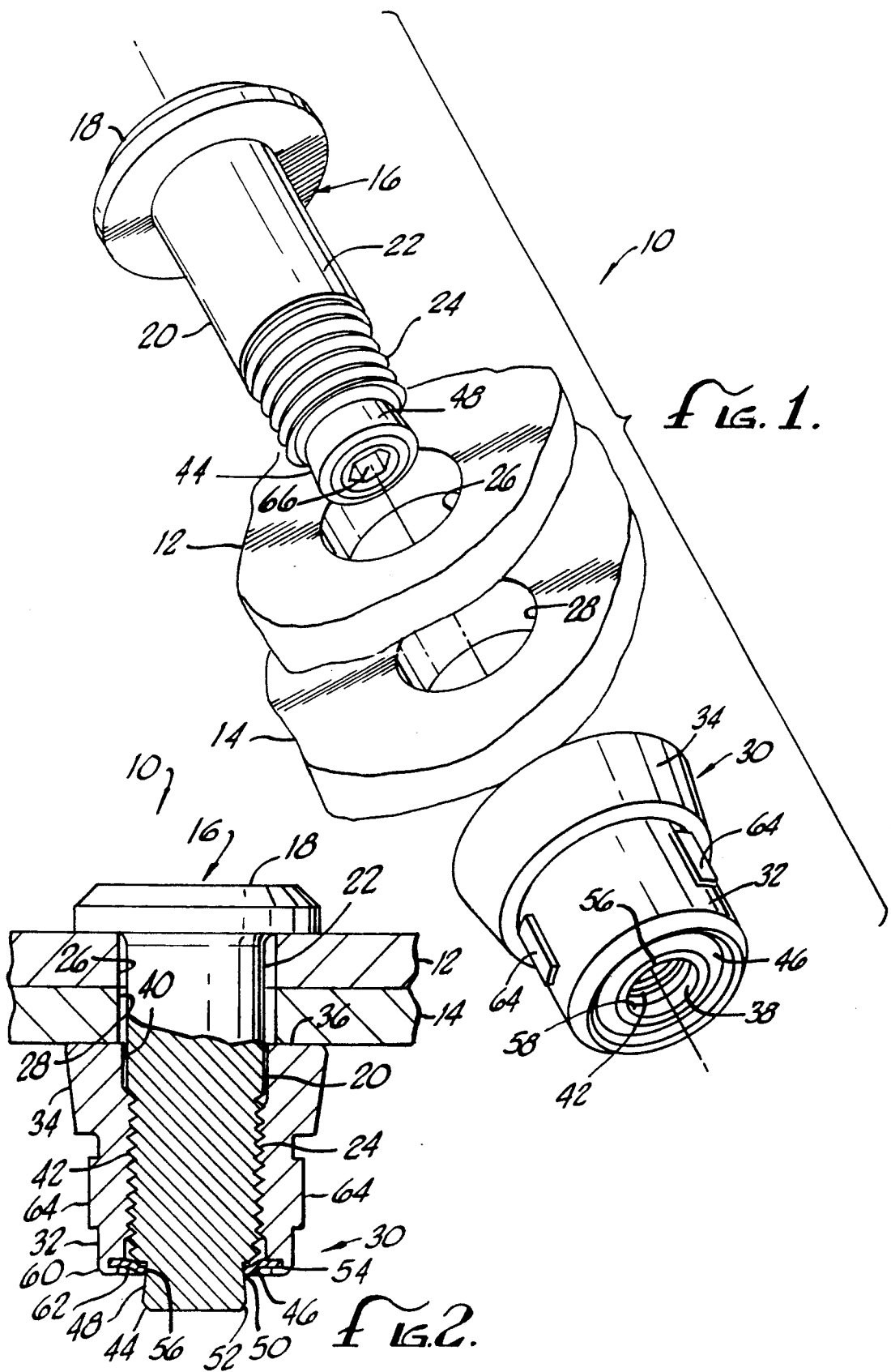

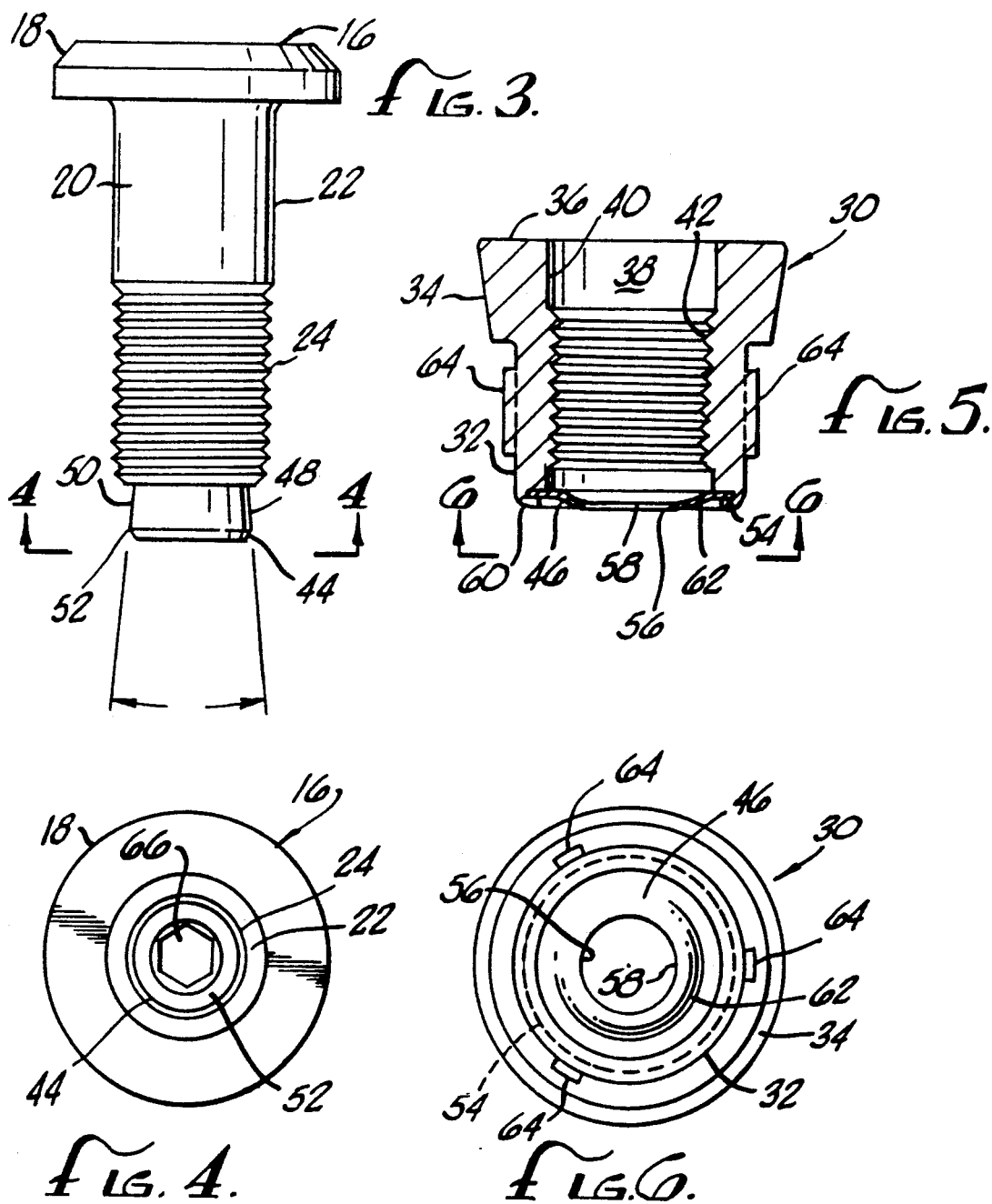

FASTENER WITH LOCKING RETAINER RING

BACKGROUND OF THE INVENTION

The present invention relates to fasteners for fastening aircraft structure and, more particularly, to a fastener and a related method that employs a locking feature to avoid loosening of the fastener from vibration.

A common requirement when joining panels used in building or repairing aircraft is that the fastener be resistant to the loosening effects of vibration or similar forces. In satisfying this requirement, it is necessary to set the fastener at a predetermined torque to assure enough torque for proper clamping force or preload. Too low a torque will cause inadequate fastening, and vibration applied to such a fastener will magnify the loosening effects of the vibration. Too great a torque can damage both the panel surfaces and over stress the fastener itself. Also, when joining aircraft structure, it is often necessary to use a locking feature in addition to proper torque application to further ensure that the fastener will not be loosened by vibration. This is particularly critical in areas where loose parts could cause catastrophic failure, such as in engine inlet ducts of jet aircraft.

Various types of fasteners have been developed over the years for use in building and repairing aircraft. For example, some fasteners have torque limited connections to enable setting of the fastener at a predetermined torque, while others have a locknut type arrangement to create a fastening that is more secure than standard threaded nut and bolt arrangements that incorporate cotter pins and/or lock wire to prevent disassembly.

Setting a fastener to a predetermined torque can be accomplished through the use of nuts which have torque limited connections that cooperate with the tool used to secure the nut to a bolt. For example, the fastener shown in U.S. Pat. No. 4,068,555 uses a torque limited nut which threads onto the bolt. The outer surface of the nut has external splines which mate with matching internal splines in a drive ring which fits over the nut. When a predetermined amount of torque has been applied to the drive ring, the external splines on the nut shear to prevent further application of torque. A person applying torque knows that additional torque is required if it is possible to apply more torque with the driving tool.

Fasteners having locking features such as retaining rings to prevent loosening during vibration are shown, for example, in U.S. Pat. No. 1,809,620. Similarly, U.S. Pat. No. 4,260,005 shows a fastener that uses a deformable collar to make a locking connection. However, both of these fastener arrangements require the bolt threads to engage either the retaining ring or collar. This type of locking feature is susceptible to vibrations which rotate the bolt threads back through the very path they traveled when engaging the retaining ring or collar. In effect, the threads can act to guide the bolt to disengagement within the nut. While some locking fasteners do not utilize the bolt threads to make the locking connection, such as the fastener shown in U.S. Pat. No. 1,795,570, fasteners of this type are not without their problems.

Accordingly, there has existed a definite need for a fastener for securing structural members, such as aircraft panels, which can be easily and reliably set to a predetermined torque. There also has existed a definite need for a fastener that provides a secure locking connection to prevent loosening of the fastener after it has been set. The present invention satisfies these needs and provides further related advantages.

SUMMARY OF THE INVENTION

The present invention is embodied in a fastener and method for fastening two structural members together in overlapping relation. The fastener comprises a bolt and a nut having a unique locking feature that prevents unthreading of the bolt as a result of vibration or other forces. The nut also is provided with a special torque limiting feature to ensure setting of the fastener at a desired torque. Furthermore, the fastener is intended to be relatively inexpensive to manufacture, simple to install and reliable in use.

The fastener comprises a nut having an internally threaded bore and a bolt having an externally threaded stem adapted for threaded engagement with the nut. The bolt has an enlarged head at one end of the stem and an unthreaded tip at the other. In accordance with the invention, the tip is in the shape of a frustum and has a diameter which increases in a direction away from the enlarged head to form a tapered, frustoconical surface.

The nut includes a retainer ring at one end for deformable engagement with the tip to make a locking connection resistant to loosening from vibration. More specifically, the retainer ring has outer edges secured within the bore of the nut and inner edges adapted to deformably engage and fit over the outer end of the tip. Thus, when the fastener is being set by the application of torque, the inner edges of the retainer ring deform slightly as the outer end of the tip passes through. Once the outer end of the tip has passed through the retainer ring, the inner edges of the retainer ring slide down the narrowing frustoconical surface of the tip and begin to return to their normal, undeformed condition. When the fastener is fully set, the inner edges of the retainer ring will engage the tip's frustoconical surface at a narrow base portion of the tip. In this way, unthreading of the bolt from the nut from vibration is prevented.

In one aspect of the invention, the angle of the frustoconical surface of the tip with respect to the longitudinal axis of the bolt is approximately one degree. This angle, although relatively small, is sufficient to prevent the retainer ring from disengaging from the tip during vibration. This is because loosening of the bolt from the nut would require that the retainer ring deform along the increasingly larger diameter portions of the frustoconical tip. In practice, normal vibrational forces would not be sufficient to cause such deformation.

In another aspect of the invention, the nut has an outer surface with a plurality of shear tabs for engagement by a wrenching tool. During setting of the fastener, the wrenching tool either rotates the nut or holds it against rotation by engaging the shear tabs. Similarly, the bolt may be either rotated or held against rotation by a wrench receiving opening that is axially disposed in the tip. In any event, once a predetermined amount of torque has been applied to the nut, the shear tabs are adapted to shear off to prevent the further application of torque. This ensures that the fastener is fully and properly set at the desired torque to prevent damage to the panels being fastened and to the fastener itself.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings

FIG. 1 is an exploded perspective view of a fastener embodying the novel features of the invention shown prior to assembly to connect two panels together;

FIG. 2 is an elevational view of the fastener, partly in cross-section, showing the fastener in a set position;

FIG. 3 is an elevational view of the fastener's bolt;

FIG. 4 is a bottom plan view of the bolt taken substantially along line 4—4 of FIG. 3;

FIG. 5 is an elevational cross-sectional view of the fastener's nut; and

FIG. 6 is a bottom plan view of the nut taken substantially along line 6—6 of FIG. 5.

DETAILED DESCRIPTION OF THE PREFERRED EMBODIMENT

As shown in the exemplary drawings, the present invention is embodied in a fastener, generally referred to by the reference numeral 10, for use in connecting two panels 12 and 14 together in overlapping relation. FIG. 1 shows the fastener 10 prior to installation. The fastener 10 comprises a bolt 16 having an enlarged head 18 at its outer end for engagement with the outer surface of one of the panels 12. The bolt 16 also includes a cylindrical stem 20 having an unthreaded portion 22 adjacent to the enlarged head 18 and an externally threaded portion 24 at its inserted end. The unthreaded portion 22 of the stem 20 is designed to fit within aligned holes 26 and 28 in each of the panels 12 and 14. In this regard, the outer diameter of the unthreaded portion 22 of the stem 20 is designed to be slightly smaller than the diameter of the panel holes 26 and 28 so that the fastener 10 will fit freely within the holes, yet minimize any lateral movement of the panels 12 and 14.

The fastener 10 also comprises a nut 30 having a substantially cylindrical body 32 with an enlarged base 34 at its inner end for abutting relationship with the outer surface of the panel 14 on the other side of the bolt head 18. The enlarged base 34 preferably has a large surface area 36 for contact with the panel 14. This large surface area 36 on the nut 30 helps reduce the possibility that the nut will rotate relative to the panel 14 during vibration which could tend to cause loosening of the fastener 10 as a whole. It also helps distribute the compressive forces applied to the panel 14 by the nut 3 during and after the fastener 10 is set. This is especially important when the panels 12 and 14 are made from composite materials.

The nut 30 also includes an axial bore 38 having an unthreaded cylindrical portion 40 at its inner end in the area of the enlarged base 34. It further includes an internally threaded portion 42 extending from the unthreaded portion 40 toward the outer end of the nut 30. The external threads 24 on the stem 20 are designed to threadably engage the internal threads 42 on the nut 30 and, when the fastener 10 is fully set, as shown in FIG. 2, the unthreaded portion 22 of the stem 20 is received within the unthreaded portion 40 of the nut 30.

In accordance with the invention, the fastener 10 is provided with a special locking feature that prevents loosening of the bolt 16 from the nut 30 due to vibration or similar forces. The locking feature comprises an unthreaded tip 44 at the inserted end of the bolt 16 that cooperates with a retainer ring 46 within the nut 30. More particularly, as shown in FIG. 3, the tip 44 comprises an unthreaded surface 48 on the stem in the shape of a frustum and has a diameter which increases in a direction away from the bolt threads 24 to form a tapered, frustoconical surface 48. In this regard, the frustoconical tip 44 includes a narrow base portion 50 and a wider outer end 52, with the base portion 50 having a diameter that is slightly smaller than the diameter of the outer end 52. As a result, the tip 44 has a diameter which increases from the base 50, where the diameter is the smallest, to the outer end 52, where the diameter is the greatest. It is noted, however, that the diameter of the tip's outer end 52 is smaller than the bolt thread diameter to thereby enable the bolt threads 24 to freely engage the nut threads 42.

In the preferred embodiment, the angle of the frustoconical surface 48 of the tip 44 with respect to the longitudinal axis of the bolt 16 is at least one degree. In other words, the angle $\alpha$ (FIG. 3) of the apex corresponding to the frustum is at least two degrees. In use, it has been found that an apex angle of at least 2° is necessary, and that an angle of between 1°-3° is optimal. The significance of this angle and the locking nature of the frustoconical tip 44 with respect to the retainer ring 46 is discussed below.

The retainer ring 46 is substantially annular in shape and has outer edges 54 secured to the nut 30 and inner edges 56 extending into the bore 38 to define a circular opening 58. More particularly, as shown in FIG. 5, the outer edges 54 of the retainer ring 46 are connected to the nut 30 by a crimping operation that forms an inturned flange 60 to hold the retainer ring in place. This can be accomplished by well known manufacturing techniques. A tapered section 62 on the retainer ring 46 provides a transition between the outer edges 54 and the inner edges 56 of the ring such that the inner edges 5 protrude slightly outwardly where they terminate at the circular opening 58. The diameter of this circular opening 58 is designed to be about the same size as the diameter of the base 50 of the frustoconical tip 44.

The outer surface of the nut body 32 also is provided with a plurality of shear tabs 64 extending radially outwardly from the nut 30. These shear tabs 64 are designed to be engaged by a wrenching tool (not shown for setting the fastener 10. The tip 44 also includes an axial wrench-receiving opening or socket 66 in its outer end 52. In this way, appropriate wrenching tools may be applied to the shear tabs 64 on the nut 30 and to the socket 66 in the tip 44 to cause relative rotation between the bolt 16 and the nut 30 to set the fastener 10. This may be done manually or by hand-held power tools.

It is also noted that the socket 66, shown best in FIG. 4, allows an operator to restrain the bolt from turning until the fastener 10 has been set. It also can be used to remove the fastener 10. In the preferred embodiment, the socket 66 is adapted to receive a hexagonally-shaped wrenching tool.

In accordance with the invention, the shear tabs 64 on the nut 30 are designed to shear away from the nut when a predetermined amount of torque has been applied to set the fastener 10. In essence, the shear tabs 64 function as a torque-limiting device to prevent too much torque from being applied when setting the fastener 10. This advantageously prevents damage to the panels 12 and 14 being fastened, which is especially important when dealing with panels constructed from composite materials. The torque-limiting feature also prevents damage to the fastener 10 itself from over-torquing, which could undesirably weaken or strip the bolt and nut threads 24 and 42.

In order to ensure that the shear tabs 64 shear from the nut 30 at the proper torque, the configuration of the shear tabs, as well as the materials from which they are made, can be appropriately designed. In the preferred embodiment, the shear tabs 64 are rectangular in crossection and are constructed from aluminum alloy, titanium alloy and various compositions of stainless steels. While the preferred embodiment illustrates the use of three shear tabs 64, additional or fewer shear tabs can be placed on the nut 30 to either increase or decrease, respectively, the amount of torque necessary for the tabs to shear away.

In use, the bolt 16 is inserted through the aligned holes 26 and 28 in the panels 12 and 14 until the enlarged head 18 on the bolt 16 contacts the outer surface of one of the panels 12 and the inserted end of the bolt protrudes out of the hole 28, with at least a portion of the bolt threads 24 being exposed. The nut 30 is then threaded onto the bolt 16 by rotating the nut with respect to the bolt to cause the bolt to move axially outwardly with respect to the nut during the initial setting of the fastener 10. Once the nut 30 has been partially threaded onto the bolt 16, or even prior to that point, the wrenching tools may be applied such that one tool engages the shear tabs 64 on the nut 30 and another tool engages the socket 66 in the bolt tip 44. Continued rotation of the nut 30 with respect to the bolt 16 causes the bolt tip 44 to move outwardly through the nut and eventually into engagement with the inner edges 56 of the retainer ring 46. Since the diameter of the outer end 52 of the tip 44 is larger than the diameter of the circular opening 58 formed by the inner edges 56 of the retainer ring 46, the bolt tip 44 will deform the inner edges 56 of the retainer ring 46 outwardly during setting of the fastener 10. The tapered transition 62 between the outer edges 54 and inner edges 56 of the retainer ring 46 facilitates this deformation process. After the outer end 52 of the bolt tip 44 has passed completely through the retainer ring opening 58 during setting of the fastener 10, the inner edges 54 of the retainer ring 46 will slide down the unthreaded frustoconical surface 48 of the tip 44 and begin to deform back to their original undeformed state. When the fastener 10 is fully set, the shear tabs 64 on the nut 30 are sheared away to prevent further application of torque. At this point, the inner edges 56 of the retainer ring 46 will ideally be at about the base 50 of the tip 44, as shown in FIG. 2.

The locking function provided by the bolt tip 44 and retainer ring 46 is consistent and reliably prevents unthreading of the bolt 16 from the nut 30 after the fastener 10 has been set. Although the angle of the frustoconical surface 48 is relatively small, it is nevertheless sufficient to prevent the retainer ring 46 from disengaging from the tip 44 during normal vibration. Disengagement is inhibited because even minor loosening of the bolt 16 from the nut 30 would require that the inner edges 56 of the retainer ring 46 deform along the increasingly larger diameter of the frustoconical tip 44. In practice, normal vibrational forces encountered in aircraft operation would not be sufficient to cause such deformation. Moreover, the tapered transition 62 on the retainer ring 46 makes the retainer ring more resistant to deformation in an inward direction.

A very significant advantage of the invention is that it provides two separate and independent connections between the bolt 16 and the nut 30 to prevent loosening from vibration. As noted above, the bolt 16 has threads 24 which engage the threads 42 on the nut 30 to provide a secure torque-limited connection. This connection is backed up by the anti-loosening function of the tip 44 and retainer ring 46 which do not depend in any way on the threaded nut and bolt connection. This is important and advantageous because the threads 24 on the bolt 16 do not engage the inner edges 56 of the retainer ring 46 and, therefore, cannot act as guides to disengage the bolt 16 from the nut 30 should they begin to rotate relative to each other as a result of vibration. Again, this is due to the unthreaded, frustoconical tip 44 and its enlarged outer end 52 which inhibits the retainer ring 4 from deforming and sliding off the bolt 16. Thus, the present invention, while maintaining the advantages of conventional threaded engagement, does not utilize the threads 24 and 42 of the bolt 16 or the nut 30 in any way to provide a secure locking function resistant to the loosening effects of vibration.

While a particular form of the invention has been illustrated and described, it will be appreciated that various modifications can be made without departing from the spirit and scope of the invention. Therefore, it is not intended that the invention be limited, except as by the appended claims.

I claim:

1. A fastener, comprising:
   (a) a nut having an axial bore and an internally threaded portion of the bore;
   (b) a bolt having an externally threaded stem adapted for threaded engagement with the internally threaded portion of the bore of the nut, the bolt having an enlarged heat at one end of the stem and an unthreaded tip at the other end of the stem, the tip having a diameter which increases in a direction away from the enlarged head to form a tapered, frustoconical surface, with the largest diameter of the tip at its outer end being smaller than the diameter of the threaded stem; and
   (c) a retainer ring secured within the bore of the nut and having inner edges adapted to deformably engage and fit over the outer end of the tip such that, when the fastener is fully set by the application of torque to cause relative rotation between the nut and the bolt, the outer end of the tip will have passed through the retainer ring so that the inner edges of the retainer ring will engage the tip's frustoconical surface to prevent unthreading of the bolt from the nut.

2. The fastener of claim 1, wherein the unthreaded tip on the bolt further comprises a base adjacent to the externally threaded stem, wherein the base has a smaller diameter than the outer end of the tip.

3. The fastener of claim 1, wherein the angle of the frustoconical surface of the tip with respect to the longitudinal axis of the bolt is between approximately one degree to two degrees.

4. The fastener of claim 1, wherein the angle of the frustoconical surface of the tip with respect to the longitudinal axis of the bolt is at least one degree.

5. The fastener of claim 1, wherein the nut has an outer surface with at least one shear tab for engagement by a wrenching tool, and wherein the shear tab is adapted to shear off when a predetermined amount of torque has been applied to the nut.

6. The fastener of claim 5, wherein the nut has three shear tabs circumferentially spaced apart on the outer surface of the nut.

7. The fastener of claim 5, wherein the nut has an enlarged base for engagement with the surface of a workpiece upon setting of the fastener.

8. The fastener of claim 7, wherein the retainer ring is received within a groove in the nut's bore, and wherein the groove is at an end of the nut opposite the nut's enlarged base.

9. The fastener of claim 1, wherein the tip includes an axial wrench receiving opening in its outer end.

10. A method of fastening overlapping panels with a fastener of the type having an externally threaded bolt and an internally threaded nut, the method comprising the steps of:
 (a) inserting the bolt through aligned holes in the panels until an enlarged head on the bolt contacts an outer surface of one of the panels and the inserted end of the bolt protrudes out of the holes;
 (b) threading the nut onto the bolt by rotating the nut with respect to the bolt to cause the bolt to move axially outwardly with respect to the nut to set the fastener;
 (c) whereby continued rotation of the nut causes an unthreaded tip on the inserted end of the bolt to engage and pas through a deformable retainer ring secured in the bore of the nut, such that when the fastener is fully set the retainer ring will engage a frustoconical surface on the tip to prevent unthreading of the nut from the bolt.

11. The method of claim 10, further comprising the steps of:
 (a) applying a wrench to the nut so that shear tabs on the outer surface of the nut are in engagement with the wrench;
 (b) rotating the nut by applying toque with the wrench until the shear tabs on the nut are sheared away to prevent further application of torque.

12. A fastener, comprising:
 (a) a nut having an inner end, an outer end, an axial bore and an internally threaded portion of the bore;
 (b) a bolt for insertion into the axial bore at the inner end of the nut, said bolt having an externally threaded stem adapted for threaded engagement with the internally threaded portion of the bore of the nut, the bolt having an enlarged head at one end of the stem and an unthreaded tip at the other end of the stem, the tip having a diameter which increases in a direction away from the enlarged head to form a tapered, frustoconical surface, with the largest diameter of the ti at its outer end being smaller than the diameter of the threaded stem; and
 (c) a retainer ring secured within the bore of the nut having outer edges, a tapered section and inner edges, said tapered section providing a transition between the outer edges and the inner edges of the ring such that the inner edges are closer than the outer edges to the outer end of the nut, wherein said inner edges are adapted to deformably engage and fit over the outer end of the tip such that, when the fastener is fully set by the application of torque to cause relative rotation between the nut and the bolt, the outer end of the tip will have passed through the retainer ring so that the inner edges of the retainer ring will engage the tip's frustoconical surface to prevent unthreading of the bolt from the nut.

13. The fastener of claim 12, wherein the inner edges protrude slightly outwardly.

14. The fastener of claim 12, wherein the retainer ring is received within a groove in the nut's bore, an wherein the groove is at an end of the nut opposite the nut's enlarged base.

* * * * *